Sept. 16, 1969   N. H. M. MIGNOT ET AL   3,467,841
AMAGNETIC CRYOGENIC MOTOR

Filed May 16, 1966   2 Sheets-Sheet 1

Inventors
Henri Noël Marie Mignot
and Andre Robert Raymond Stahl
By Lillepage & Quaintance
Attys

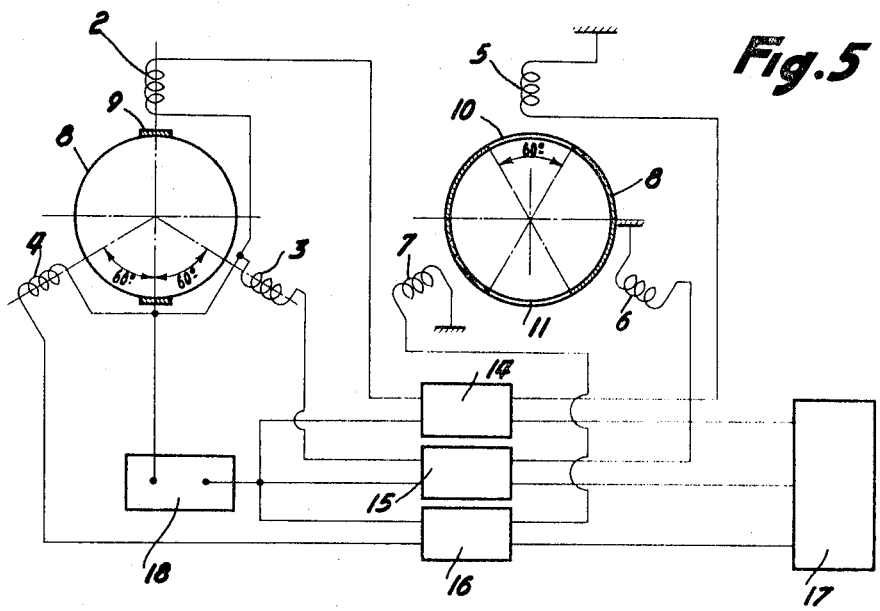
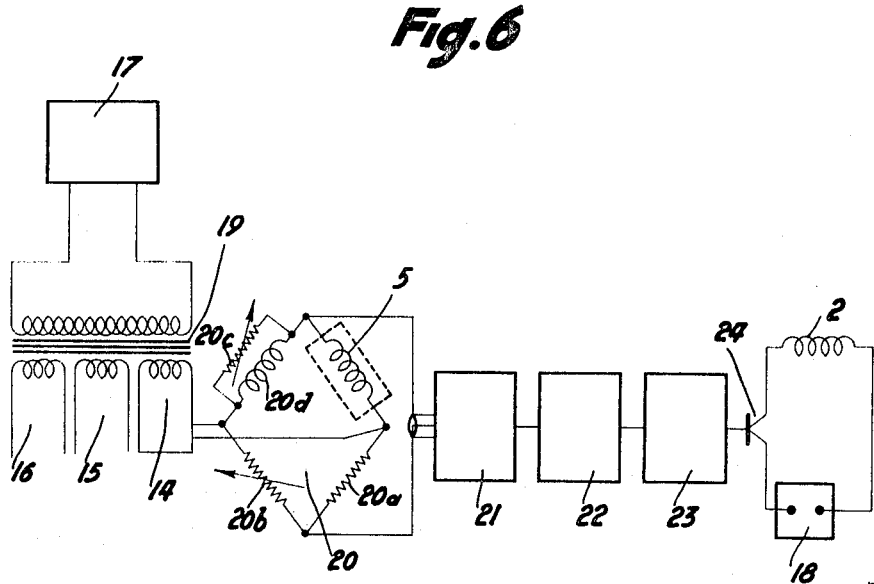

United States Patent Office 3,467,841
Patented Sept. 16, 1969

3,467,841
AMAGNETIC CRYOGENIC MOTOR
Noël Henri Marie Mignot, Versailles, and André Robert Raymond Stahl, Paris, France, assignors to societe anonyme Societe Alsacienne de Constructions Atomiques de Telecommunications et d'Electronique "Alcatel," Paris, France, a corporation of France
Filed May 16, 1966, Ser. No. 550,222
Claims priority, application France, May 17, 1965, 17,337
Int. Cl. H02k 37/00
U.S. Cl. 310—10                    10 Claims

ABSTRACT OF THE DISCLOSURE

A self synchronizing cryogenic motor has a stator composed of rectangular loops of superconducting wire above radially oriented synchronization coils. A rotor is a cut-out niobium cylinder which surrounds the stator. A remaining wall of an upper portion of the cylinder forms a turn which cooperates with the inductor loops. Below the turn the rotor's cylindrical wall has windows which pass ends of the synchronization coils, causing synchronization pulses.

---

Figure 1:
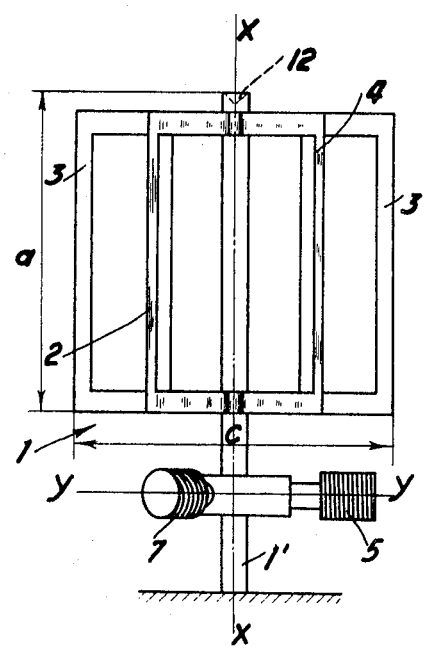

This invention relates to an entirely amagnetic cryogenic motor provided with a self-synchronizing device. Motors of this type may in particular be applied to the construction of helium liquefiers with production of external work, to the driving of superconducting gyroscopes, and so on.

Cryogenic motors of known types operate by means of a rotating field or a field formed of impulses, said field being produced by a stator wound with superconducting wire energized by a chopped alternating or direct courrent, said stator surrounding a rotor having the shape of a polyhedron or cylinder with polygonal directrix, in such a manner that the forces applied by the stator normally to the surface of the rotor are not mutually cancelled and can produce a torque driving the rotor.

The synchronization of the energization of the inductor and of the rotation of the armature is generally effected by optical or inductive adjustment means, but can be affected correctly only under clearly determined conditions of energization, which in itself constitutes a considerable disadvantage. In addition, motors constructed in this manner lead to rather complex constructions.

The present invention eliminates the disadvantages of known arangements and relates to a cryogenic motor fed with direct current, which is essentially characterised in that the energization of the stator, which is composed of at least two inductor coils of superconducting wire and also an equal number of synchronization coils separate from said inductor coils, is synchronized with the movement of the rotor, which is constituted by at least one turn cut from a thin-walled cylinder of superconducting material surrounding the stator, while a plurality of identical windows are formed in said cylinder level with the syrnchronization coils, each synchronization signal being produced by the modification of the coefficient of self-inductance of a synchronization coil during the successive passages of the rotor windows in front of said coil, said syrnchronization signals being transmitted to feed the corresponding inductor coils through independent channels, each of which connects a synchronization coil to the inductor coil corresponding to it.

The arrangement provided by the invention makes it possible for each inductor coil to be fed in succession at the moment when the rotor turn, in relation to the energized coil, is situated near a position such that the torque applied to said turn by the field set up in the coil will be maximum and of constant sign.

According to an additional feature of the invention, the synchronization channels are commutated by the position of the rotor windows in relation to the synchronization coils.

According to one advantageous embodiment, the stator comprises three windings in the form of rectangular frames having a common axis and the planes of which are offset by 60°, and three synchronization coils the axes of which, converging at a point situated on the extension of said common axis, are situated respectively in the three planes formed by said frames. In combination with a stator of this type, use is advantageously made of a rotor in the form of a slender cylinder, part of which closely surrounds the stator frames while the other part, in which windows are formed, particularly two identical windows facing one another, surrounds the synchronization coils.

For the actual electrical control of the motor, an oscillator feeds a number of synchronization channels corresponding to the number of inductor coils. According to a simple embodiment, a synchronization channel may comprise a secondary winding of a transformer, the primary of which is connected to the oscillator, a balanced bridge connected by the terminals of one diagonal to said winding and by the terminals of the other diagonal to an amplifier sensitive to a synchronization signal transmitted by the bridge in the form of a train of oscillations, said amplified signal being then applied to a demodulator, to a shaping circuit, and then to a power transistor connected to the feed of an inductor coil of the stator.

In the arrangement of three inductor coils for example the three corresponding synchronization channels may be fed by the same oscillator.

Figure 3:
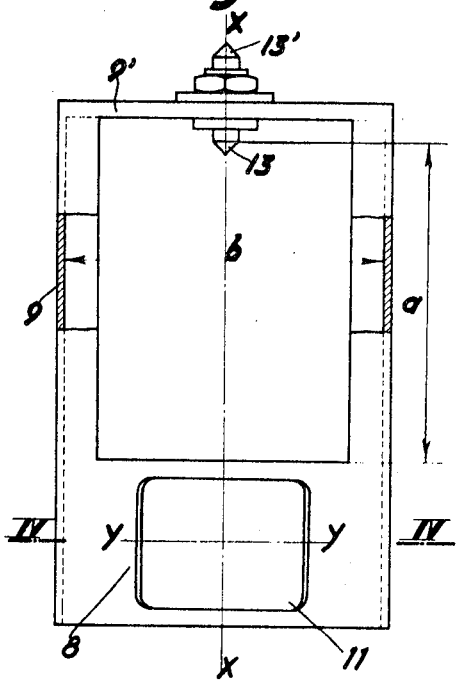
Figure 2:
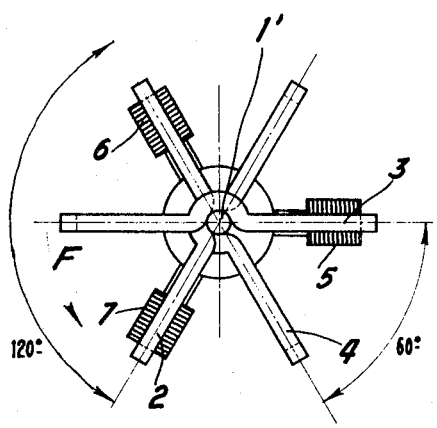
Figure 4:
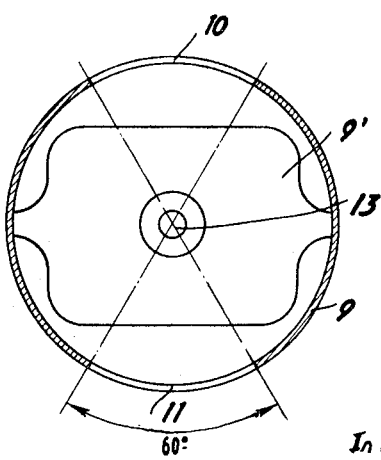

The invention is illustrated, without being limited by the description of a cryogenic motor, given below with reference to the accompanying drawings, in which:

FIGURE 1 is a diagrammatic elevation of the stator of the motor;
FIGURE 2 is a view from above of the stator;
FIGURE 3 is a diagrammatic elevation of the rotor associated with the stator illustrated in FIGURES 1 and 2;
FIGURE 4 is a view from below of the rotor in section along the line IV–IV in FIGURE 3;
FIGURE 5 is a basic diagram of the operation of the motor with its synchronization device.
FIGURE 6 illustrates the diagram of operation of one of the channels synchronizing the energization of the inductor and the rotation of the armature.

The stator illustrated in FIGURES 1 and 2 and designated by the general reference 1 comprises essentially three inductor coils in the form of frames 2, 3, 4, of generally rectangular shape and of superconducting wire, said frames being disposed so as to produce fields at 120°. In other words, the three planes of the frames 2, 3, and 4 intersect on the common axis $xx$ and are offset by 60° in relation to one another. The stator 1 comprises in addition three small synchronization coils 5, 6, and 7, likewise of superconducting wire, the axes of which are offset by 120° (FIGURE 2) and are situated in the three planes formed by the frames 2, 3, and 4. The axis of a synchronization coil forms an angle of 60° with the plane of the inductor coil corresponding to it (FIGURE 2). It will be noted in FIGURE 1 that the horizontal trace plane $yy$ containing the three axes of the coils 5, 6, and 7 is offset in relation to the base of the frames 2, 3, 4. The axis 1' common to the three frames 2, 3, 4 and supporting the coils 5, 6, 7 has at its upper part a footstock bearing 12.

The rotor associated with the stator 1, which has just been described in detail, is illustrated in FIGURES 3 and 4 and is designated by the general reference 8. The rotor 8, having an inside diameter $b$ slightly greater than the width $c$ of the coils 2, 3, 4, is constituted by the turn or sleeve 9 cut from the top of a thin-walled cylinder of superconducting material, for example niobium, at the bottom of which two diametrically opposite windows 10 and 11 having openings of 60° are formed. The rotor 8 is intended to surround the stator 1, the direction of rotation being then that indicated by the arrow F in FIGURE 2. The height $a$ of the active part of the turn 9 of the rotor is, taking into account assembly conditions, approximately equal to the height of the windings 2, 3, 4 of the stator, and the windows 10 and 11 formed in the rotor are disposed in such a manner that their centers (FIGURE 3) are situated in the plane (trace $yy$) formed by the axes of the three synchronization coils 5, 6, and 7, and that the line passing through their centers will form an angle of 90° with the plane of symmetry of the turn 9, which constitutes the plane of FIGURE 3. In the embodiment considered, the turn 9 possesses thickness of the order of magnitude of the width of an inductor coil of the stator. The axis of rotation of rotor 8 is the axis of symmetry $xx$ of the stator 1. The rotor 8 is supported by the stator 1 by means of a bearing constituted by the footstock bearing 12 and the pivot 13 fixed in the top part 9' of the rotor by a nut or by any other means, the top 13' of said pivot being intended to be received in an axial thrust bearing of a fixed frame not illustrated in the figure. For convenience of manufacture and assembly, the turn 9 may be produced from a solid sleeve in which two longitudinal millings are made, while the end 9' remains in the form of a thin solid plate.

Although in the illustrated embodiment of the invention the rotor of the motor is mounted between points as described above, mounting in any other manner can be contemplated. Thus, mounting in magnetic bearings may be found advantageous for high speeds and may moreover be obtained automatically, particularly in the technique of superconducting gyroscopes.

FIGURE 5 illustrates the basic diagram of the operation of a motor, the component parts of which have just been described. The rotor 8 is diagrammatically represented in the usual manner, on the left of the drawing by its top portion constituted by the operative turn 9, which is subjected to the action of the inductor coils 2, 3, 4. The right side of the drawing shows the bottom portion of the cylindrical rotor having windows 10 and 11, which come successively opposite synchronization coils 5, 6, 7. The latter are respectively connected to three synchronization channels which are designated by the general references 14, 15, 16, and which will be described in detail hereinafter.

A single oscillator 17 simultaneously feeds the three channels 14, 15, 16, which in turn are connected to the supply 18 for the inductor coils 2, 3, 4.

FIGURE 6 illustrates a possible diagram for forming one of the synchronization channels, namely the channel 14, corresponding to an inductor coil, namely the coil 2, and to a synchronization coil, namely the coil 5.

As can be seen in FIGURE 6, the channel 14 is supplied by the secondary of a transformer 19, the primary of which is connected to the oscillator 17. A bridge 20 comprises on the one hand the associated synchronization coil 5 and a self-induction coil, 20$d$ which is shunted by a variable resistor 20$c$, and on the other hand by a fixed resistor 20$a$ and a variable resistor 20$b$. The output in question of the secondary of the transformer 19 is connected to one diagonal of the bridge 20, while the other diagonal of the bridge is connected to an amplifier 21. The latter is connected to a demodulator 22, which is connected to a shaping circuit 23. At the output of the last-mentioned circuit 23 there is disposed a power transistor 24, which acts on the supply 18 of the inductor coil 2.

The operation of the motor may be illustrated by reference to FIGURE 6. The successive passages of the windows 10 and 11 of the rotor 8 in front of the synchronization coil 5 effect a modification of the coefficient of self-inductance of the coil 5, which is connected in a branch of the bridge 20, which is fed by the assembly comprising the oscillator 17 and transformer 19. This modification results in the unbalance of the bridge 20, which then allows a train of oscillations to pass for a duration equal to the time of passage of a window 10 or 11 of the rotor in front of the synchronization coil 5.

This signal, amplified in the amplifier 21, demodulated in the demodulator 22, and shaped in the circuit 23, unlocks the power transistor 24 and thus permits the feeding of the coil 2.

During the feeding of the coil 2 the other two energizing coils 3 and 4 are not fed, because the synchronization coils 6 and 7 have a coefficient of self-inductance such that the bridges associated with the channels 15 and 16 are balanced.

The feeding of the coils 3 and 4 is obviously triggered in the same manner as that of the coil 2, by the unbalance signals of the synchronization coils 6 and 7 mounted respectively in the channels 15 and 16, which advantageously are identical to the channel 14.

The electronic circuits such as the oscillator 17, the bridge 20, the amplifier 21, the demodulator 22, and the shaping circuit 23, which are illustrated in FIGURE 6, are fed by an ordinary source of direct current, not illustrated. These circuits may obviously be of any nature and in themselves do not form part of the invention, because they constitute components well known to those skilled in the art.

In cryogenic motors, constructed in accordance with the invention, the conversion of electrical energy into mechanical energy is effected entirely at low temperature (the temperature of liquid helium) with maximum efficiency, the only dissipation of heat being effected in the current supply wires, thus permitting the construction of motors of very small dimensions.

The value of the torque is constant at the moment when the motor is started and also at its operating speed, for a constant load and a constant current.

The speed of rotation may attain several tens of thousands of revolutions per minute and is limited only by the mechanical strength of the rotor. A motor of the type illustrated in the drawings but mounted on magnetic bearings thus made it possible to attain speeds of the order of 36,000 r.p.m. at the temperature of liquid helium.

The motor described above by way of example may obviously undergo various modifications with regard to the arrangement of the stator and rotor or the nature of the electronic components of the synchronization channels.

What is claimed is:

1. A motor comprising stator and rotor devices; one of the devices mounting a plurality of inductor coils and a like number of synchronization coils spaced from the inductor coils; the other of the devices comprising a cutout cylinder defining therein at least one turn defined by a remaining wall of the cylinder and having a cylindrical wall which defines a plurality of windows, the two devices being juxtapositioned for relative rotation, windows being disposed adjacent the synchronization coils; at least one power supply connected to the inductor coils; a plurality of synchronization channels interconnected to corresponding synchronization coils and inductor coils; whereby successive passages of the windows and the synchronization coils produce synchronization signals which are transmitted through corresponding channels to the supply for energizing corresponding inductor coils.

2. A motor according to claim 1, wherein said stator comprises three inductor coils, each of said inductor coils having the form of rectangular frames, said rectangular frames having a common axis and having planes offset by 60°, and three synchronization coils, each of said synchronization coils having a synchronization axis, three synchronization axis converging at a point situated on said common axis, and being situated respectively in said planes formed by said frames, the axis of a synchronization coil forming an angle of 60° with a plane of an inductor coil corresponding to it.

3. A motor according to claim 1, wherein the rotor has the form of a thin cylinder, a part of which closely surrounds said inductor coils of the stator, while the other part surrounds the synchronization coils, said other part comprising windows.

4. A motor according to claim 1, wherein a synchronization channel comprises a secondary winding of a transformer, the primary of which is connected to the oscillator, a balanced bridge connected by the terminals of one diagonal to said winding and by the terminals of the other diagonal to an amplifier sensitive to a cynchronisation signal generated by the bridge in the form of a train of oscillations, said amplified signal being then applied to a demodulator, a shaping circuit, and then to a power transistor connected to the supply of an induction coil of the stator.

5. The motor of Claim 1 wherein the said other of the stator and rotor devices comprises a cut-out cylinder of superconducting material defining therein at least one turn.

6. The apparatus of Claim 1 wherein the said one of the devices is a stator, and wherein the said other of the device is a rotor comprising a cut-out cylinder of superconducting material defining therein at least one turn and a plurality of identical windows, and wherein the rotor partially encloses the stator.

7. The motor of claim 1 wherein the plurality of inductor coils comprises a plurality of rectangular conductor frames intersecting in a common axis and having planes equiangularly disposed about the axis.

8. The motor of claim 1 wherein the synchronization coils comprise wires wound about axes which radially diverge from a common center, the axes lying in a common plane and being equiangularly disposed around the common center.

9. The motor of claim 8 wherein the cylindrical wall surrounds the synchronization coils and wherein centers of windows in the cylindrical wall are in the plane common to the synchronization coils.

10. The motor of claim 9 wherein the inductor coils comprise rectangular frames perpendicular to the plane common to synchronization coil axes, the frames being equiangularly disposed about an axis perpendicular to said plane at said center, and wherein the turn comprises a remaining wall of the cut-out cylinder partially surrounding the frames.

References Cited

UNITED STATES PATENTS

| | | | |
|---|---|---|---|
| 2,719,944 | 10/1955 | Brailsford | 318—254 |
| 3,050,671 | 8/1962 | Möller | 318—171 |
| 3,297,891 | 1/1967 | Foran | 310—46 |
| 3,346,792 | 10/1967 | Noumi | 318—138 |

DAVID X. SLINEY, Primary Examiner

U.S. Cl. X.R.

310—46, 219